(12) United States Patent
Wu et al.

(10) Patent No.: US 7,840,953 B2
(45) Date of Patent: Nov. 23, 2010

(54) METHOD AND SYSTEM FOR REDUCING PROGRAM CODE SIZE

(75) Inventors: Youfeng Wu, Palo Alto, CA (US); Mauricio Breternitz, Jr., Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1704 days.

(21) Appl. No.: 11/020,481

(22) Filed: Dec. 22, 2004

(65) Prior Publication Data

US 2006/0136678 A1 Jun. 22, 2006

(51) Int. Cl.
*G06F 9/45* (2006.01)

(52) U.S. Cl. ..................................................... 717/159

(58) Field of Classification Search .................. 717/151, 717/159; 711/151; 345/474; 463/31; 712/21, 712/215, 218
See application file for complete search history.

(56) References Cited

U.S. PATENT DOCUMENTS

| | | | |
|---|---|---|---|
| 5,790,874 A * | 8/1998 | Takano et al. ............... | 713/320 |
| 6,170,083 B1 | 1/2001 | Adl-Tabatabai | |
| 6,304,954 B1 * | 10/2001 | Munson ....................... | 712/215 |
| 6,484,228 B2 * | 11/2002 | Breternitz et al. .............. | 711/1 |
| 6,725,362 B2 | 4/2004 | Kahn et al. | |
| 6,795,781 B2 | 9/2004 | Aldridge et al. | |
| 6,907,598 B2 * | 6/2005 | Fraser ......................... | 717/127 |

OTHER PUBLICATIONS

"Thumb-2: Improved Code Density with Performance and Power Efficiency," ARM, available at http://www.arm.com/products/CPUs/archi-thumb2.html, printed on May 19, 2005.
P. Brisk et al., "Framework and Design Methodology of a Compiler that Compresses Code Using Echo Instructions," ODES-2: 2nd Workshop on Optimizations for DSP and Embedded Systems, in conjunction with CG004, Mar. 21, 2004.
K. Cooper et al., "Enhanced Code Compression for Embedded RISC Processors," Proceedings of the Conference on Programming Language Design and Implementation, May 1999.
"GCC Code-Size Benchmark Environment (CSiBE)," Univ. of Szeged, available at http://sed.inf.u.-szeged.hu/csibe/obs-size.php, printed on May 19, 2005.

(Continued)

*Primary Examiner*—Tuan Anh Vu

(57) ABSTRACT

In a method for reducing code size a replaceable subset of instructions at a first location within a set of instructions and a matching target subset of instructions at a second location within the set of instructions are identified. A base offset and a relative offset are determined. The base offset and the relative offset indicate an absolute offset from the first location to the second location. An instruction to cause a base offset storage element to be loaded with the base offset is inserted prior to the first location. The replaceable subset of instructions is replaced with a second instruction to cause a program counter to be modified based on the relative offset and a value in the base offset register so that the modified program counter indicates the second location.

8 Claims, 11 Drawing Sheets

OTHER PUBLICATIONS

S. Debray et al., "Compiler Techniques for Code Compression," ACM Trans. on Programming Languages and Systems, pp. 378-415, 2000.

C. Fraser. "An Instruction for Direct Interpretation of LZ77-Compressed Programs," Microsoft Technical Report MSR-TR-2002-90, available at ftp://ftp.research.microsoft.com/pub/tr/tr-2002-90.pdf, Sep. 2002.

"Embedded Components and Flash Memory," Intel® Corporation, available at http://www.intel.com/products/embedded/index.htm, printed on May 19, 2005.

A. Krishnaswamy et al., "Profile Guided Selection of ARM and Thumb Instructions," LCTES' 02-SCOPES' 02, Jun. 19-21, 2002, Berlin, Germany, pp. 56-64.

K. Kunchithapadam et al., "Using Lightweight Procedures to Improve Instruction Cache Performance," University of Wisconsin, CS-TR-99-1390, 1999.

J. Lau et al., "Reducing Code Size with Echo Instructions," Proceedings of the International Conference on Compilers, Architectures and Synthesis for Embedded Systems, Oct. 2003.

S. Liao. "Code Generation and Optimization for Embedded Digital Signal Processors," Ph.D. Thesis, Massachusetts Institute of Technology, 1996.

"National Geode x86 'appliance-on-chip' SOCs," Linux Devices.com, available at http://www.linuxdevices.com/products/PD6094486551.html, printed on May 19, 2005.

"Via Embedded Partner Products," Via Technologies, Inc., available at http://www.viaembedded.com/index.isp, printed on May 23, 2005.

J. Ziv et al., "A Universal Algorithm for Sequential Data Compression," Transaction on Information Theory, vol. 23, No. 3, pp. 337-343, May 1977.

Y. Wu, et al., "Echo Technology (ET) for Memory Constrained CISC Processors," presented at Int'l Conf. on Compilers, Architecture, and Synthesis for Embedded Systems (CASES) Sep. 2004.

* cited by examiner

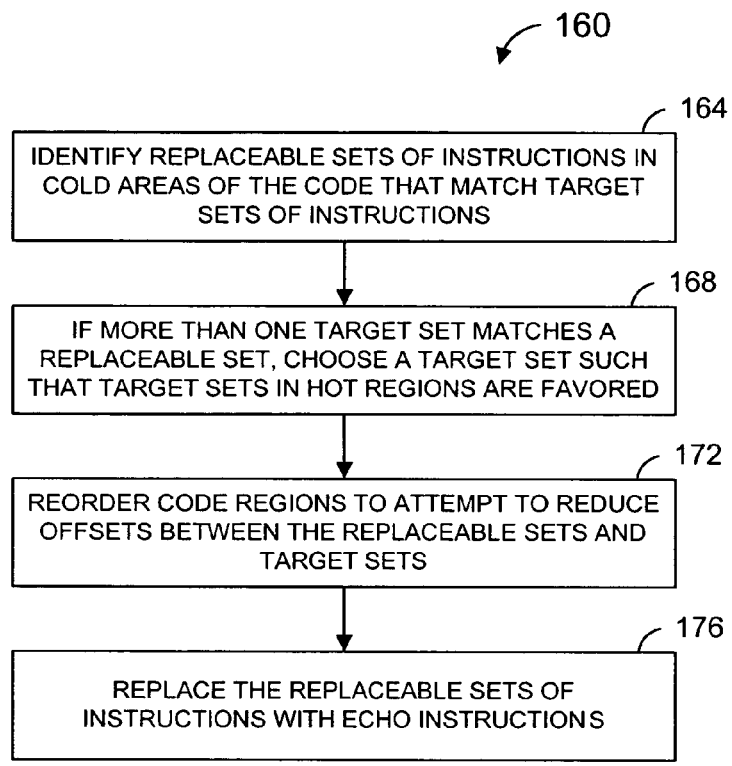

For each pair of replaceable set and target set of instructions that are in different areas A1 and A2
    Offset1 = the offset of the Echo instruction when A1 is placed immediately before A2
    Weight1 = Echo region size / Offset1
    Add weight1 to edge A1->A2
    Offset2 = the offset of the Echo instruction when A2 is placed immediately before A1
    Weight1 = Echo region size / Offset2
    Add weight1 to edge A2->A1
For each node A
    Let A->list = {A}
While (the graph has edge A1->A2 not merged)
    Merge the two nodes connected by the highest weight as a new node A12
    Redirect edges to the merged node
    A12->list = A1->list + A2->list
Final list = {}
For each node A in the final graph
    Final list += A->list

FIG. 5

```
struct ProcessedInst code[num_insts];

for (i=1;i<num_insts;i+=stepped_insts) {
    stepped_insts = 1;
    if (is_in_hot_area(i))
        continue;
    if (is_non_echoble_inst(i))
        continue;
    early_index = 0;
    for (unsigned int j=early_index;j<i;j++) {
        region_bytes = 0;
        region_insts = 0;
        target_idx = 0;
        if (!is_inst_match(j, i))
            continue;
        nbytes = code[i].size;
        ninsts = 1;
        nexti = i+1;
        nextj = j+1;
        while (ninsts < max_echo_region_size && nextj < i && (is_inst_match(nexti, nextj))) {
            if (is_br_target(nextj))
                break;
            if (is_in_hot_area(nexti))
                break;
            nbytes += code[nexti].size;
            ninsts++;
            nexti++;
            nextj++;
        }
        if (is_better_candidate(region_bytes, target_idx, nbytes, j)) {
            region_bytes = nbytes;
            region_insts = ninsts;
            target_idx = j;
        }
    }
    record_echo_region_and_target(i, region_insts, target_idx);
    stepped_insts = region_insts;
}
```

```
Struct ProcessedInst code[num_insts];                        ← 260 for (i=1;i<num_insts;i+=stepped_insts) {
        stepped_insts = 1;
        code[i].compressed_pc = code[i-1].compressed_pc + code[i-1].size
        if (is_in_hot_area(i))
                continue
        if (is_non_echoble_inst(i))
                continue;
        early_index = get_earlest_inst(i);
        for (unsigned int j=early_index;j<i;j++) {
                region_bytes = 0;
                region_insts = 0;
                target_idx = 0;

if (!is_inst_match(j, i))
                        continue;
                nbytes = code[i].size;
                ninsts = 1;
                nexti = i+1;
                nextj = j+1;
                while (ninsts < max_echo_region_size && nextj < i && (is_inst_match(nexti, nextj))) {
                        if (is_br_target(nextj))
                                break;
                        nbytes += code[nexti].size;
                        ninsts++;
                        nexti++;
                        nextj++;
                }
                if (is_better_candidate(region_bytes, target_idx, nbytes, j)) {
                        region_bytes = nbytes;
                        region_insts = ninsts;
                        target_idx = j;
                }
        }
        if (region_may_not_be_echoed(region_bytes, region_insts, i - target_idx,
&best_echo_inst_size))
                continue;
        replace_region_by_echo_inst(i, i+region_insts-1, best_echo_inst_size);
        stepped_insts = region_insts;
}
```

Struct ProcessedInst code[num_insts];

for (i=1;i<num_insts;i+=stepped_insts) {
        stepped_insts = 1;
        code[i].compressed_pc = code[i-1].compressed_pc + code[i-1].size
        if (is_non_echoble_inst(i))
                continue;
        early_index = get_earlest_inst(i);
        for (unsigned int j=early_index;j<i;j++) {
                region_bytes = 0;
                region_insts = 0;
                target_idx = 0;

if (!is_inst_match(j, i))
                        continue;
                nbytes = code[i].size;
                ninsts = 1;
                nexti = i+1;
                nextj = j+1;
                while (ninsts < max_echo_region_size && nextj < i && (is_inst_match(nexti, nextj))) {
                        if (is_br_target(nextj))
                                break;
                        nbytes += code[nexti].size;
                        ninsts++;
                        nexti++;
                        nextj++;
                }
                if (is_better_candidate(region_bytes, target_idx, nbytes, j)) {
                        region_bytes = nbytes;
                        region_insts = ninsts;
                        target_idx = j;
                }
        }
        if (region_may_not_be_echoed(region_bytes, region_insts, i - target_idx, &best_echo_inst_size))
                continue;
        replace_region_by_echo_inst(i, i+region_insts-1, best_echo_inst_size);
        stepped_insts = region_insts;
}
boost_echos();
```

FIG. 9

METHOD AND SYSTEM FOR REDUCING PROGRAM CODE SIZE

CROSS-REFERENCE TO RELATED APPLICATIONS

This application is related to U.S. patent application Ser. No. 11/020,340, entitled "METHOD AND SYSTEM FOR REDUCING PROGRAM CODE SIZE," filed on the same day as the present application, and is hereby incorporated by reference herein in its entirety for all purposes.

FIELD OF THE DISCLOSURE

The present disclosure relates generally to computer systems and more particularly to methods and systems for reducing the size of a program to be executed by a computer system.

BACKGROUND

In some computer systems, the size of a program to be executed may be subject to constraints. For example, the computer system may have a limited amount of memory in which to store the program. Techniques have been developed to compress the size of a program.

For example, one technique, often referred to as "Echo Technology," replaces a set of instructions in a program with a single "Echo Instruction" which typically have the format "Echo (offset, length)". The "offset" parameter may specify an offset between a location of a replaceable set of instructions (to be replaced by the single Echo Instruction) and a location of a target set of instructions that match the instructions in the replaceable set. The "length" parameter may specify a number of instructions in the replaceable set of instructions. When the Echo Instruction is executed, the "offset" parameter is used to cause control to branch to the location of the target set of instructions. Then, the processor begins to execute the instructions in the target set. The "length" parameter is used to determine when control should branch back to the instruction immediately following the Echo Instruction. Because many instructions can be replaced by a smaller number of Echo Instructions, this technique may help to reduce the size of a program.

An illustrative example will be described with reference to Tables 1 and 2. Table 1 lists instructions and their locations in an example set of program code. The set of instructions at locations 340 to 356 matches the set of instructions at locations 100 to 116. Thus, the instructions at locations 340 to 356 can be replaced by an Echo Instruction which indicates an offset of 240 (340 minus 100) and a length of 5. The instructions at locations 340 to 356 can be referred to as a replaceable set of instructions. Table 2 shows a list of instructions in which the instructions at locations 340 to 356 have been replaced by an Echo Instruction that indicates an offset of 240 and a length of 5. Thus, the Echo Instruction at location 340 points to the five instructions starting at the location 100, which may be referred to as a target set of instructions.

TABLE 1

| Location | Instruction |
|---|---|
| 100 | mov |
| 104 | shl |
| 108 | xor |

TABLE 1-continued

| Location | Instruction |
|---|---|
| 112 | add |
| 116 | movsx |
| ... | ... |
| 340 | mov |
| 344 | shl |
| 348 | xor |
| 352 | add |
| 356 | movsx |
| ... | ... |
| 404 | mov |
| 408 | shl |
| 412 | xor |
| 416 | add |
| 420 | movsx |
| ... | ... |

TABLE 2

| Location | Instruction |
|---|---|
| 100 | mov |
| 104 | shl |
| 108 | xor |
| 112 | add |
| 116 | movsx |
| ... | ... |
| 340 | Echo(240, 5) |
| ... | ... |
| 388 | mov |
| 392 | shl |
| 396 | xor |
| 400 | add |
| 404 | movsx |
| ... | ... |

Because the five instructions at locations 340 to 356 have been replaced by a single Echo Instruction, the instructions that were at locations 404 to 420 (in Table 1) will now be at the locations 388 to 404 (Table 2). These instructions also match the set of instructions at locations 100 to 116. Thus, the instructions at locations 388 to 404 can be replaced by an Echo Instruction which indicates an offset of 288 (388 minus 100) and a length of 5. Table 3 shows a list of instructions in which the instructions at locations 388 to 404 have been replaced by an Echo Instruction that indicates an offset of 288 and a length of 5. Thus, the Echo Instruction at location 388 points to the five instructions starting at the location 100.

TABLE 3

| Location | Instruction |
|---|---|
| 100 | mov |
| 104 | shl |
| 108 | xor |
| 112 | add |
| 116 | movsx |
| ... | ... |
| 340 | Echo(240, 5) |
| ... | ... |
| 388 | Echo(288, 5) |
| ... | ... |

BRIEF DESCRIPTION OF THE DRAWINGS

FIG. 2 is a flow diagram of an example method for compressing code that may be implemented by a system such as the system of FIG. 1.

FIG. 4 is an example routine, in pseudocode, for implementing a portion of the method of FIG. 3.

FIG. 5 is another example routine, in pseudocode, for implementing a portion of the method of FIG. 3.

FIG. 6 is another example routine, in pseudocode, for implementing a portion of the method of FIG. 3.

FIG. 9 is an example routine, in pseudocode, for implementing a portion of the method of FIG. 8.

DETAILED DESCRIPTION

Figure 1:
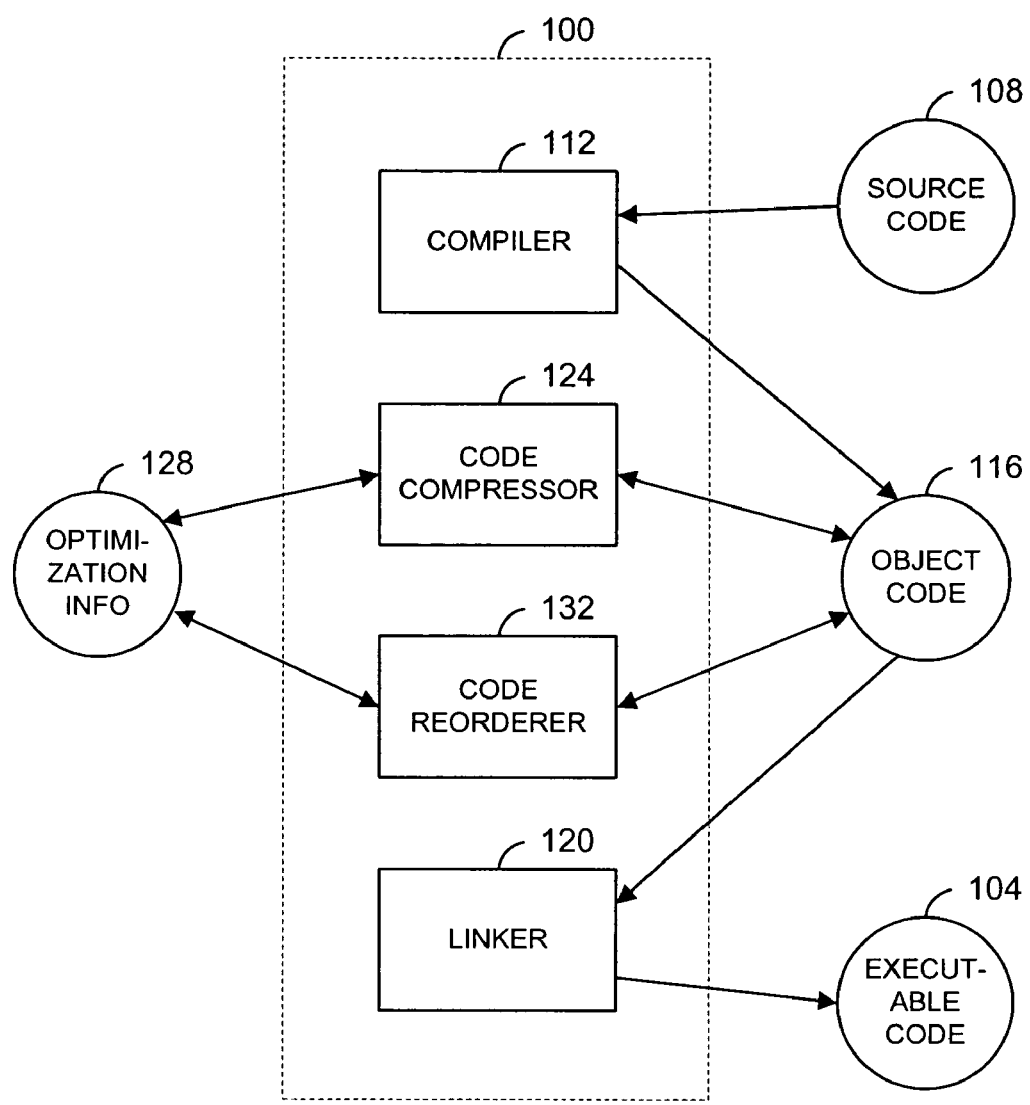
FIG. 1 is a block diagram of an example system for generating machine executable code from source code.

FIG. 1 is a block diagram of an example system 100 for generating machine executable code 104 from source code 108. The system 100 also attempts to reduce the size of the executable code 104 by utilizing Echo Instructions. Further, the system 100 attempts to improve performance of the compressed executable code 104 by utilizing Echo Instructions that point to target code in areas that are frequently executed.

The system 100 includes a compiler 112 that compiles the source code 108 into object code 116. The system also includes a linker 120 that generates the executable code 104 from the object code 116. The system 100 additionally includes a code compressor 124 that compresses the object code 116. In particular, the code compressor 124 identifies replaceable sets of instructions in areas of the code that have been determined to be infrequently executed (hereinafter referred to as "cold areas") and target sets of instructions that match the replaceable sets of instructions. The code compressor 124 may store indications of matches of replaceable sets of instructions with target sets of instructions as optimization information 128. The optimization information 128 may also include information that identifies the cold areas in the object code 116, and may further include information that identifies areas of code that have been determined to be frequently executed (hereinafter referred to as "hot areas"). A variety of techniques, including techniques known to those of ordinary skill in the art, may be used to identify cold areas and hot areas of the code. For example, a variety of code profiling techniques may be used to identify cold areas and hot areas of the code. The code compressor 124 may replace some or all of the replaceable sets of instructions with Echo Instructions.

The system 100 further includes a code reorderer 132 that rearranges the object code 116. For example, the code reorderer 132 may attempt to rearrange cold areas and hot areas in the object code in an attempt to reduce offsets between the replaceable sets of instructions and the matching target sets of instructions.

The source code 108 may include computer program instructions written in a variety of programming languages such as C language, C++ language, C# language, FORTRAN language, etc. The compiler 112 may comprise any suitable compiler including compilers known to those of ordinary skill in the art. The linker 120 may comprise any suitable linker including linkers known to those of ordinary skill in the art. The executable code 104 may include machine executable code executable by a variety of processors including currently available processors and processors not yet developed. In some implementations, the linker 120 may be omitted. In these implementations, the object code 116 may comprise machine executable code.

In another implementation, the source code 108 may include computer program instructions written in one of a variety of assembly languages. In this implementation, the compiler 112 may be replaced by any suitable assembler including assemblers known to those of ordinary skill in the art. In general the instructions operated upon by the code compressor 124 and the code reorderer 132 may be generated from source code using any suitable system for converting source code into object code and/or machine executable code.

In another implementation, the code compressor 124 and the code reorderer 132 may operate on the machine executable code 104 rather than the object code 116.

FIG. 2 is a flow diagram of an example method 160 for compressing code that may be implemented by a system such as the system 100 of FIG. 1. The flow of FIG. 2 will be explained with reference to FIG. 1. At a block 164, replaceable sets of instructions in cold areas and target sets of instructions that match the replaceable sets of instructions are identified. For example, the code compressor 124 may identify the replaceable sets and target sets. Any number of techniques can be used to identify the replaceable and target sets. For example, techniques known to those of ordinary skill in the art can be modified to identify matching first and target sets of instructions where the replaceable sets of instructions are in cold areas.

The first and target sets of instructions may be identified subject to one or more constraints in addition to the instructions in the replaceable and target sets matching and that the replaceable sets are in cold areas. For example, one constraint may be that each replaceable set of instructions must be less than or equal to a maximum length. As discussed previously, some Echo Instructions have the format "Echo (offset, length)", where the "length" parameter specifies a number of instructions in the replaceable set of instructions. The format of the Echo Instruction may allocate a certain number of bits to the "length" parameter, thus dictating a maximum value of the length parameter. This maximum value of the length parameter may correspond to the maximum length of each replaceable set of instructions. Additionally, some implementations may include several Echo Instructions each having a different instruction length and/or format. This may allow, for example, different Echo instructions to have "offset" and/or "length" parameters having differing numbers of bits. In such implementations, the maximum length of each replaceable set of instructions may correspond to the Echo Instruction "length" parameter having the largest number of bits.

Another example of an optional constraint is that only replaceable sets are identified that, when replaced with Echo Instructions, result in a smaller size code. For instance, if a replaceable set is too small in size, replacing it with an Echo Instruction may actually increase the size of the code.

If more than one target set is identified for a replaceable set at the block 164, one target set is chosen, at a block 168, such that target sets in hot areas are favored over target sets in cold areas. For example, if a target set in a hot area and a target set in a cold area both match a replaceable set, the target set in the hot area will be chosen. Additional criteria may optionally be used to choose a target set from a plurality of matching sets. For example, offsets between the replaceable set and respective target sets may optionally be used to choose one of the target sets. For instance, if two or more target sets in hot areas match, the target set with the smallest offset to the replaceable set may optionally be chosen. Alternatively, the first identified or the last identified target set in a hot area may be chosen. The code compressor 124 may choose the one target set and may determine whether a particular target set is in a cold area or a hot area based on cold/hot area information in the optimization information 128.

At a block 172, code regions may be reordered in an attempt to reduce offsets between the replaceable sets and their matching target sets. Any number of techniques, including techniques known to those of ordinary skill in the art, may be used. In one implementation, for example, a graph optimization technique is used in which a graph is built having code areas as nodes, and edges between the nodes having weights based on the offsets between matching replaceable set and target set pairs. Optionally, the weights may also be based on the sizes of the matching replaceable set and target set pairs. Then, the graph may be linearized so that a total weighted linear distance is minimized. A graph reduction technique, for example, may be used to linearize the graph. Examples of other techniques known to those of ordinary skill in the art that can be used to reorder code regions to attempt to reduce offsets include integer programming techniques and exhaustive search techniques.

At a block 176, at least some of the replaceable sets of instructions identified at the block 164 are replaced with Echo Instructions. For example, the code compressor 124 may replace at least some of the replaceable sets of instructions with Echo Instructions. As discussed above, some implementations may include several Echo Instructions each having a different instruction length and/or format. This may allow, for example, different Echo instructions to have "offset" and/or "length" parameters having differing numbers of bits. In these implementations, a replaceable set may optionally be replaced with the shortest Echo Instruction possible given the length of the replaceable set and the offset from the replaceable set to the matching target set.

Figure 3:
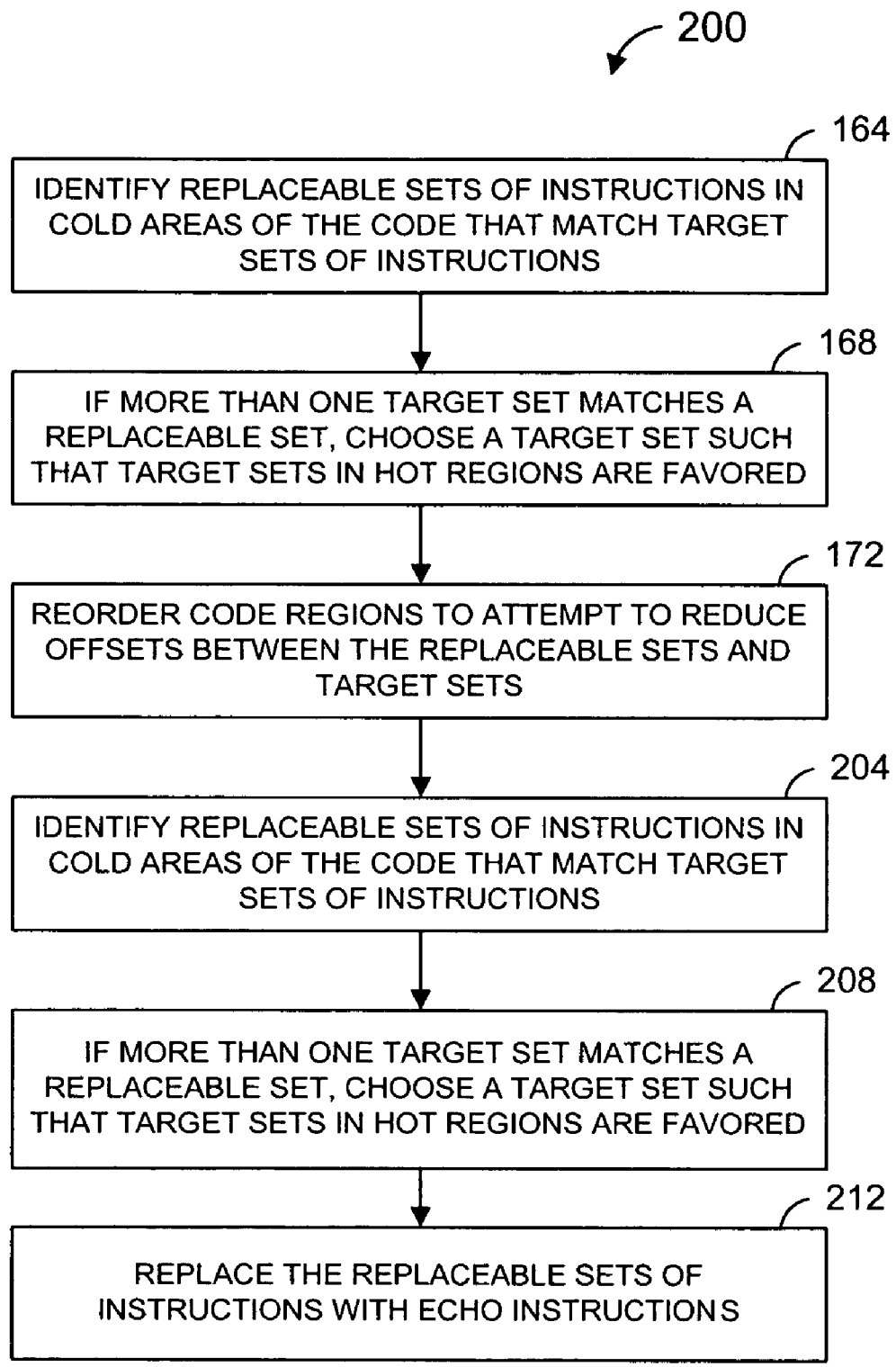
FIG. 3 is a flow diagram of another example method for compressing code that may be implemented by a system such as the system of FIG. 1.

FIG. 3 is a flow diagram of another example method 200 for compressing code that may be implemented by a system such as the system 100 of FIG. 1. The flow of FIG. 3 will be explained with reference to FIG. 1. The blocks 164, 168, and 172 are the same as in FIG. 2. After the block 172, at a block 204, replaceable sets of instructions in cold areas and target sets of instructions that match the replaceable sets of instructions are again identified. Identifying the replaceable and target sets may be implemented in a manner similar to the block 204. The first and target sets of instructions may be identified at the block 204 with or without using information from the identification of such sets at the block 164.

If more than one target set is identified for a replaceable set at the block 204, one target set is chosen, at a block 208, such that target sets in hot areas are favored over target sets in cold areas. Choosing a target set may be implemented in the same or similar manner as the block 168. The same criteria or different criteria as used at the block 168 may be used at the bock 208.

At the block 212, at least some of the replaceable sets of instructions identified at the block 164 are replaced with Echo Instructions. The block 212 may be implemented in a manner similar to or the same as the block 176 of FIG. 2.

FIG. 4 is an example routine 220, in pseudocode, for implementing the blocks 164 and 168 of FIG. 3. An input to the routine 220 is the data structure "code", which includes a plurality of instructions to be compressed. The data structure "code" may be of the form:

```
struct ProcessedInst {
    char size;
    char *abs_bits;
    char is_br_target;
    char is_non_echoable;
    char is_echo;
    unsigned compressed_pc;
};
```

The "size" field indicates the number of bytes of a particular instruction in the array. The "abs_bits" field is a pointer to decoded bits corresponding to the instruction, with PC-relative addresses replaced by absolute addresses. The "is_br_target" field indicates whether or not the current instruction is a target of a branch. The "is_non_echoable" field indicates that the instruction should not be in a replaceable set of instructions that can be replaced by an Echo Instruction. The "is_echo" field is used to indicate a first instruction in a set of instructions that is to be replaced by an Echo Instruction. The "compressed_pc" field indicates a program counter corresponding to the instruction after previous instructions have been replaced by Echo Instructions. The "compressed_pc" field of the first instruction in the structure is zero.

An i-loop of the routine 220 examines cold areas of the instructions, starting at code[i], and a j-loop examines both hot and cold areas from code[0] to code[i−1], in an attempt to find replaceable sets of instructions that match target sets of instructions. A function "is_in_hot_area(i)" determines whether the instruction code[i] is in a hot area.

A function "is_non_echoable_inst(i)" determines whether the instruction code[i] can be replaced by an Echo Instruction. For example, in some implementations, it may be decided that certain instructions should not be replaced by an Echo Instruction. For instance, it may be decided that if a set of instructions includes an instruction that is a target of a branch instruction and if that instruction is not the first instruction in the set of instructions, the set of instructions should not be replaced by an Echo Instruction. As another example, it may be decided that if a set of instructions includes looping or branching instructions, the set of instructions should not be replaced by an Echo Instruction.

A function "is_inst_match(j, i)" determines if the instruction at code[i] matches the instruction at code[j]. A function "is_better_candidate(prev_region_size, prev_target, cur_region_size, cur_target)" determines whether a current potential target set of instructions is better than a previously identified potential target set of instructions. Typically, if two potential target sets of instructions both match instructions starting at code[x], but one of the potential target sets is longer, the longer of the two potential target sets is considered "better." Also, if two potential target sets of instructions have the same length, but one is in a hot area and the other is in a cold area, the potential target set in the hot area is considered "better."

A function "record_echo_region_and_target(echo_region, region_size, echo_target)" records information regarding the identified replaceable set of instructions and the chosen target sets of instructions that match the replaceable sets.

FIG. 5 is an example routine 240, in pseudocode, for implementing the block 172 of FIG. 3. An input to the routine 240 is a set of code areas that can be reordered, a list of replaceable sets of instructions and matching target sets of instructions generated at the blocks 164 and 168. The routine 240 builds a graph with the code areas as nodes and the weight on a directed edge A1→A2 indicates how important that area A1 should be placed immediately before area A2. Once the graph is built, it may be linearized so that the total weighted linear distance is minimized. The routine may use a graph reduction technique, for example, to linearize the graph.

FIG. 6 is an example routine 260, in pseudocode, for implementing the blocks 204, 208, and 212 of FIG. 3. The routine 260 is similar to the routine 220 of FIG. 4. A routine get_earlest_inst(i) finds an earliest instruction index, early_index, such that the difference between the code[i].compressed_pc and code[early_index].compressed_pc is less than or equal to a maximum offset supported by a processor architecture. A function "region_may_not_be_echoed(region_size, region_inst, offset, &best_echo_inst_size)" determines if a candidate replaceable set of instructions can be beneficially replaced by an Echo Instruction taking into consideration criteria such as processor architecture limitations. For example, a candidate replaceable set of instructions could be too small such that replacing it with any Echo Instruction may increase the code size. If the candidate replaceable set of instructions can be replaced by any of multiple Echo Instructions, a smallest Echo Instruction is chosen and the corresponding Echo Instruction size is returned in the variable best_echo_inst_size. A routine "replace_region_by_echo_inst(region_begin, region_end, echo_inst_size)" will replace the replaceable set of instructions by the selected Echo Instruction. In this event, the "size" field for the first instruction in the set to be replaced is set to the size of the Echo Instruction, and the "size" fields for the other instructions in the set are set to zero. Additionally, the "compressed_pc" fields for the instructions in the set replaced by the Echo Instruction are updated.

Figure 7:
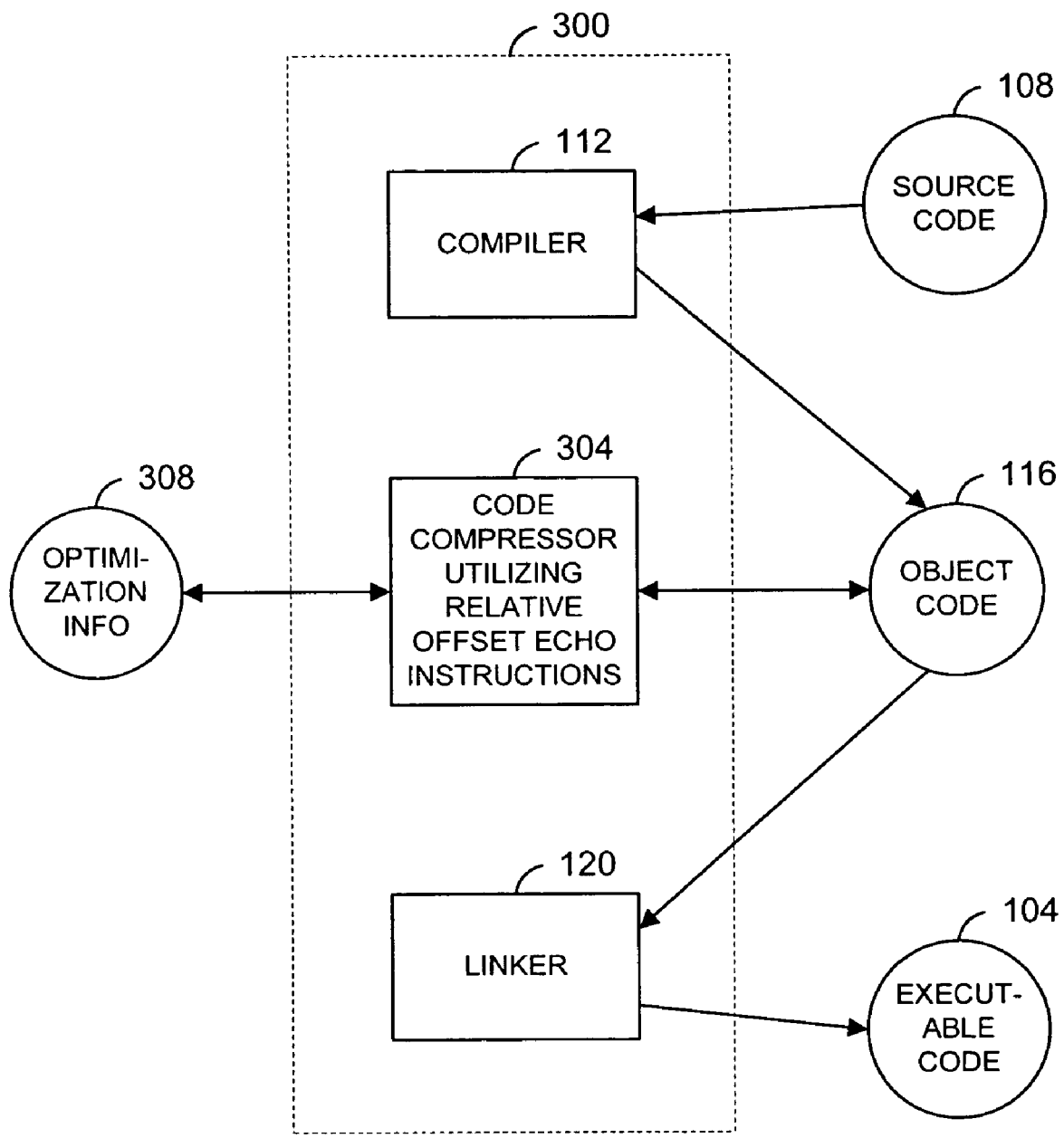
FIG. 7 is a block diagram of another example system for generating machine executable code from source code.

FIG. 7 is a block diagram of another example system 300 for generating machine executable code 104 from source code 108. The system 300 also attempts to reduce the size of the executable code 104 utilizing a different type of Echo Instruction as will be described below.

Similar to the system 100 of FIG. 1, the system 300 includes a compiler 112 that compiles the source code 108 into object code 116. The system 300 also includes a linker 120 that generates the executable code 108 from the object code 116. The system 300 additionally includes a code compressor 304 that compresses the object code 116. In particular, the code compressor 304 identifies replaceable sets of instructions and target sets of instructions that match the replaceable sets of instructions. The code compressor 304 may store indications of matches of replaceable sets of instructions with target sets of instructions as optimization information 308.

In the example system 300, the code compressor 304 utilizes instructions having a format such as the format "Echo (relative_offset, length)". Such instructions will be referred to hereinafter as Relative Offset Echo Instructions. Relative Offset Echo Instructions are similar to the Echo Instruction described above, but the offset from the Relative Offset Echo Instruction to the target set of instructions is determined by adding the relative_offset to a base_offset. The base_offset may be set using an instruction having a format such as the format "setEchoBase(base_offset)". Such instructions will hereinafter be referred to as Set Echo Base Instructions. The Relative Offset Echo Instructions may be made smaller than the Echo Instructions described previously because the relative offsets will tend to be smaller than the absolute offset. Thus, a smaller number of bits are required to represent a relative offset as opposed to an absolute offset. On the other hand, additional Set Echo Base Instructions are required to be inserted in the code. On the whole, however, the use of Relative Offset Echo Instructions may lead to a smaller code size as compared to the Echo Instructions described previously.

In another implementation, the code compressor 304 may operate on the machine executable code 104 rather than the object code 116.

Figure 8:
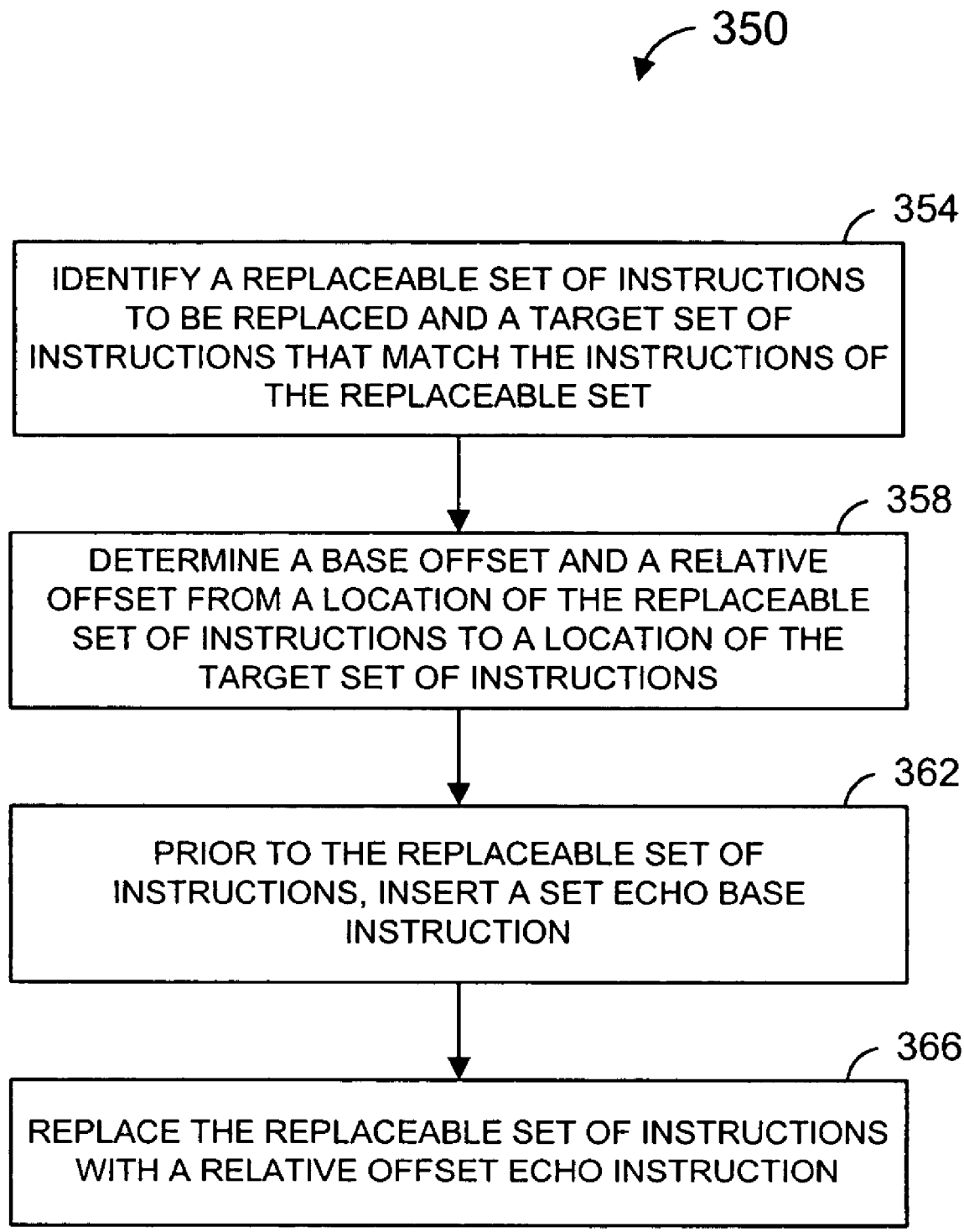
FIG. 8 is flow diagram of an example method for compressing code that may be implemented by a system such as the system of FIG. 7.

FIG. 8 is flow diagram of an example method 350 for compressing code that may be implemented by a system such as the system 300 of FIG. 7. The flow of FIG. 8 will be explained with reference to FIG. 7. At a block 354, a replaceable set of instructions and a target set of instructions that match the replaceable set are identified. For example, the code compressor 304 may identify the replaceable set and target set. Any number of techniques, including techniques known to those of ordinary skill in the art, can be used to identify the replaceable and target sets. The block 354 may comprise choosing one target set if multiple matching target sets are identified. For example, a matching target set having a smallest offset to the replaceable set may be chosen. Other criteria for selecting one target set from a plurality of matching target sets may be used additionally or alternatively.

At a block 358, a base offset and a relative offset are determined for the replaceable set of instructions and the matching target set of instructions. For example, the code compressor 304 may determine the base offset and relative offset. A variety of techniques for determining the base offset and relative offset may be used. For example, an absolute offset may first be determined, and then a base offset and a relative offset may be determined using the absolute offset. In one implementation, multiple absolute offsets corresponding to multiple pairs of replaceable sets and target sets are first determined. Then, a base offset is determined for the multiple pairs of replaceable sets and target sets. Next, relative offsets for the multiple pairs of replaceable sets and target sets are determined by subtracting the base offset from each of the absolute offsets.

At a block 362, a Set Echo Base Instruction is inserted in the code prior to the replaceable set of instructions to set a register, for example, of a processor with the base offset value determined at the block 358. Because the base offset will often be the same for multiple matching pairs of replaceable sets and target sets, the block 362 may need to be performed only once for a plurality of matching replaceable sets and target sets of instructions. The code compressor 304, for example, may insert the Set Echo Base Instruction.

At a block 366, the replaceable set of instructions is replaced by a Relative Offset Echo Instruction. The code compressor 304, for example, may insert the Relative Offset Echo Instruction. The block 366 may comprise selecting one Relative Offset Echo Instruction from a plurality of possible Relative Offset Echo Instructions. For example, a shortest Relative Offset Echo Instruction may be selected. Other criteria may be used additionally or alternatively. The order of the blocks 362 and 366 may be reversed in some implementations.

In another example, a processor architecture may include multiple base offset registers. In this example, a block may be included in the method 350 to select an appropriate Set Echo Base Instruction to set an appropriate one of the multiple base offset registers with the base offset value determined at the block 358. Additionally, a Relative Offset Echo Instruction may include a parameter that indicates an appropriate one of the multiple base offset registers to use. Similarly, opcodes of multiple Relative Offset Echo Instructions may each indicate an appropriate one of the multiple base offset registers to use.

FIG. 9 is an example routine 400, in pseudocode, for implementing the blocks 354, 358, 362, and 366 of FIG. 8. An input to the routine 400 is the data structure "code", which includes a plurality of instructions to be compressed. The routine 400 replaces sets of instructions with one of a plurality of Relative Offset Echo Instructions supported by a particular processor architecture. The routine 400 also inserts Set Echo Base Instructions at appropriate places in the code. The routine 400 is similar to the routine 260 of FIG. 6.

An i-loop of the routine 400 examines instructions, starting at code[i], and a j-loop examines instructions from code[0] to code[i−1], in an attempt to find replaceable sets of instructions that match target sets of instructions. A function "is_non_echoable_inst(i)" determines whether the instruction code[i] can be replaced by an Echo Instruction or a Relative Offset Echo Instruction. A routine get_earlest_inst (i) finds an earliest instruction index, early_index, such that the difference between the code[i].compressed_pc and code [early_index].compressed_pc is less than or equal to a maximum offset supported by a processor architecture.

A function "is_inst_match(j, i)" determines if the instruction at code[i] matches the instruction at code[j]. A function "is_better_candidate(prev_region_size, prev_target, cur_region_size, cur_target)" determines whether a current potential target set of instructions is better than a previously identified potential target set of instructions. Typically, if two potential target sets of instructions both match instructions starting at code[x], but one of the potential target sets is longer, the longer of the two potential target sets is considered "better."

A function "region_may_not_be_echoed(region_size, region_inst, offset, &best_echo_inst_size)" determines if a candidate replaceable set of instructions can be beneficially replaced by an Echo Instruction or a Relative Offset Echo Instruction, taking into consideration criteria such as processor architecture limitations. For example, a candidate replaceable set of instructions could be too small such that replacing it with any Echo Instruction or Relative Offset Echo Instruction may increase the code size. If the candidate replaceable set of instructions can be replaced by one of a plurality of Echo Instructions, a smallest Echo Instruction may be chosen and the corresponding Echo Instruction size is returned in the variable best_echo_inst_size. A routine replace_region_by_echo_inst(region_begin, region_end, echo_inst_size) replaces the current replaceable set of instructions by an Echo instruction and also updates the compressed_pc field for the instructions in the replaceable set of instructions.

Finally, a boost_echos( ) routine processes the Echo Instructions that have been inserted in the code and attempts to reduce the size of the code by replacing Echo Instructions with Relative Offset Echo Instructions and inserting Set Echo Base Instructions. Any of a variety of techniques may be used to attempt to reduce the size of the code. For example, Echo Instructions in each function of the code could be analyzed as a group. A function may have a number t of Echo Instructions with the sizes $s_1, s_2, \ldots, s_t$. If the Echo Instructions are replaced by Relative Offset Echo Instructions, the relative_offset parameters corresponding to these instructions may be reduced by subtracting a base offset B, and thus fewer bits may be needed to represent the smaller relative_offset parameters as compared to the absolute offsets. Thus, it may be possible to replace some or all of the Echo Instructions in the function, if an appropriate Set Echo Base Instruction is inserted previous to these instructions, such that Relative Offset Echo Instructions in the function have sizes $n_1, n_2, \ldots, n_t$. If the Set Echo Base Instruction has a size of S bits, it may be beneficial to insert the Set Echo Base Instruction and replace the Relative Offset Echo Instructions in the function if $$\sum_{i=1}^{t}(s_i - n_i) > S.$$

A Set Echo Base Instruction may be inserted in a function prolog, for example.

In another implementation, Echo Instructions are not first inserted and then replaced by Relative Offset Echo Instructions. Rather, Relative Offset Echo Instructions are directly inserted along with Set Echo Base Instructions.

Figure 10:
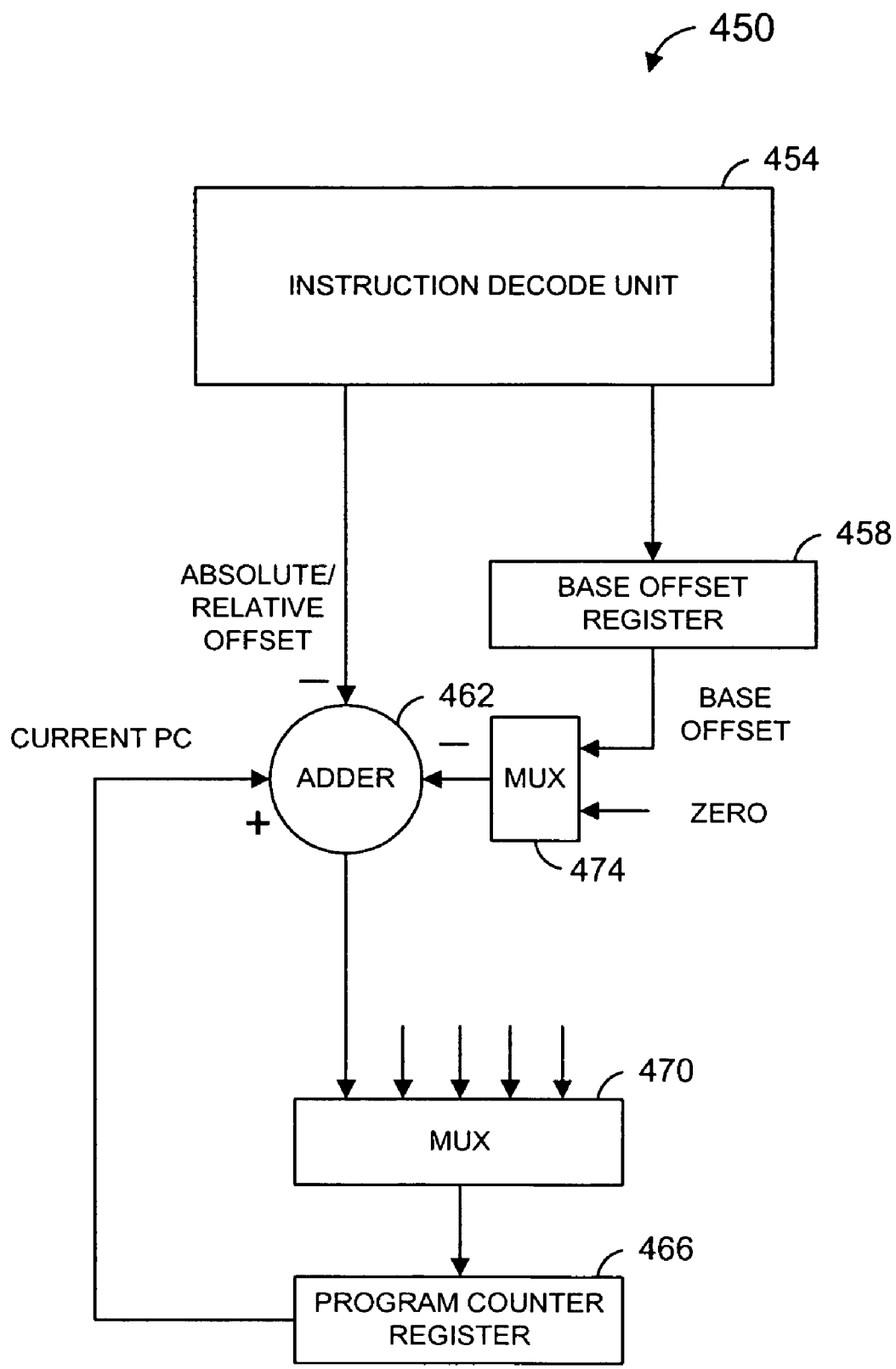
FIG. 10 is block diagram of an example subsystem of a processor configured to execute instructions that cause a program counter to be modified based on a relative offset and a base offset.

FIG. 10 is block diagram an example subsystem 450 of a processor configured to execute instructions that cause a program counter to be modified based on a relative offset and a base offset. In general, any of a variety of processors may be designed to include a subsystem such as the subsystem 450. For example, processors such as processors sold by Intel® (e.g., any of the Pentium® family, the Itanium™ family and/or the Intel XScale® family of processors) could be modified. Other types of processors and processors sold by other companies could be similarly modified. For example, a micro signal architecture (MSA) processor, a digital signal processor (DSP), a pipelined processor, a complex instruction set computer (CISC) processor, a reduced instruction set computer (RISC) processor, an explicitly parallel instruction computing (EPIC) processor, a very long instruction word (VLIW) processor, or any other type of processor could be modified to include a subsystem such as the subsystem 450.

The subsystem 450 includes an instruction decode unit 454 configured to decode Relative Offset Echo Instructions and Set Base Offset Echo Instructions. The subsystem 450 also includes a storage element 458 (e.g., a register), coupled to the instruction decode unit 454, to store a base offset. The instruction decode unit 454 may generate a base offset value by decoding a Set Echo Base Instruction, for example. Also, the instruction decode unit 454 may generate one or more control signals (not shown) to cause the base offset value to be loaded into the storage element 458 in response to a Set Echo Base Instruction.

The subsystem 450 also includes an adder 462 coupled to the instruction decode unit 454. The adder 462 subtracts from a current program counter (PC) the value stored in the storage element 458 and a relative offset value received from the instruction decode unit 454. The instruction decode unit 454 may generate the relative offset value by decoding a Relative Offset Echo Instruction.

The subsystem 450 also includes a storage element 466 (e.g., a register, a counter, etc.) for storing the PC. The storage element 466 may be coupled to an output of the adder 462 via a multiplexer 470. The multiplexer 470 may be used to load different values into the storage element 466. The storage element 466 also may be coupled to an input of the adder 462 to provide a current PC value to the adder 462.

In response to a Relative Offset Echo Instruction, the instruction decode unit 454 may generate one or more control signals (not shown) to cause the multiplexer 470 to select the output of the adder 462 to be provided to the storage element 466. Also, the instruction decode unit 454 may generate one or more control signals (not shown) to cause the storage element 466 to load the output of the adder 462.

The subsystem 450 may optionally include a multiplexer 474 to select, as an input to the adder 462, an output of the storage element 458 or the value zero. If the instruction decode unit 454 is configured to decode prior art Echo Instructions, the instruction decode unit 454 may generate one or more control signals (not shown) to cause the multiplexer 474 to select the value zero. Additionally, instruction decode unit 454 may cause the absolute offset specified by the Echo Instruction to be provided as an input of the adder 462. Alternatively, the multiplexer 474 may be omitted, and the output of the storage element 458 may be coupled to the adder 462.

In another example, the subsystem 450 may include multiple storage elements 458 for storing multiple base offsets. In this example, each Set Echo Base Instruction may indicate the particular storage element 458 that is to be loaded. For example, a Set Echo Base Instruction may include a parameter to indicate the particular storage element 458 that is to be loaded. As another example, multiple Set Echo Base Instructions may be provided, wherein each opcode of the Set Echo Base Instructions indicates a corresponding storage element 458 that is to be loaded.

Similarly, each Relative Offset Echo Instruction may indicate the particular storage element 458 that is to be used in generating the absolute offset. In this example, the multiplexer 474 could be modified to provide one base offset value from the plurality of storage elements 458 to the adder 462. The instruction decode unit 454 may generate one or more control signals to control the multiplexer 474 to select an appropriate base offset value from the plurality of storage elements 458. The Relative Offset Echo Instruction may include a parameter to indicate the particular storage element 458 that is to be used. As another example, multiple Relative Offset Echo Instructions may be provided, wherein each opcode of the Relative Offset Echo Instructions indicates a corresponding storage element 458 that is to be used.

The instruction decode unit 454 may be configured as described above using any number of techniques, including techniques known to those of ordinary skill in the art. For example, the instruction decode unit 454 could be implemented using hardware.

Figure 11:
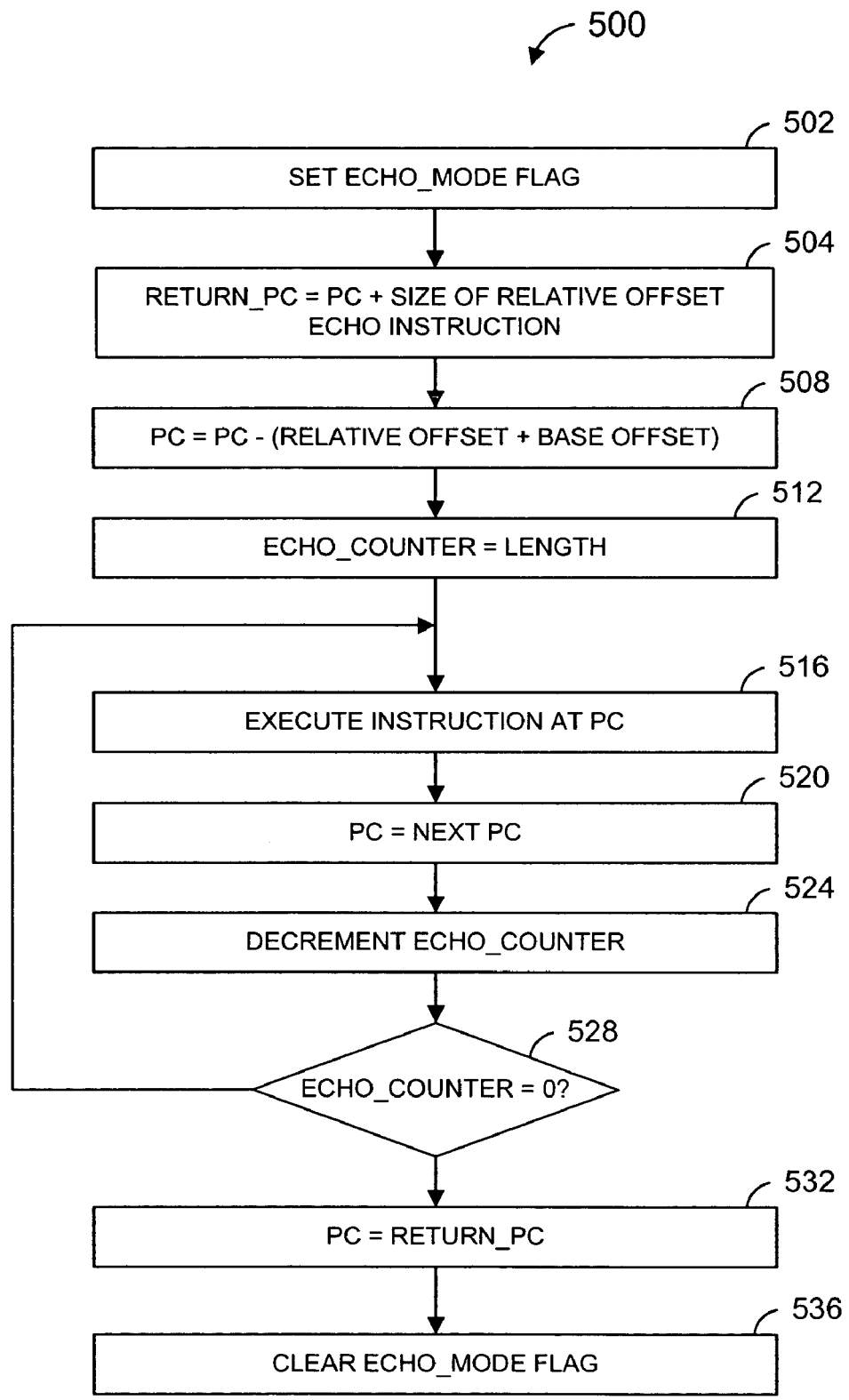
FIG. 11 is a flow diagram of an example method for, in response to an instruction at a first location, executing a set of instructions at a second location indicated by the instruction at the first location.

FIG. 11 is a flow diagram of an example method 500 for, in response to an instruction (e.g., a Relative Offset Echo Instruction) at a first location, executing a set of instructions (e.g., a target set) at a second location indicated by the instruction at the first location. The method 500 may be implemented using a subsystem such as the system 450 of FIG. 10, for example. In general, the method 500 can be implemented by a suitably configured processor. Processors that could be modified to implement the method 500 include processors sold by Intel® (e.g., any of the Pentium® family, the Itanium™ family and/or the Intel XScale® family of processors), similar processors sold by other companies, an MSA processor, a DSP, a pipelined processor, a CISC processor, a RISC processor, an EPIC processor, a VLIW processor, etc.

At a block 502, an ECHO_MODE flag should be set to indicate that the instructions being executed are in response to a Relative Offset Echo Instruction or an Echo Instruction. At a block 504, a RETURN_PC value is calculated as the current PC plus the size of the Relative Offset Echo Instruction. At a block 508, the PC is modified by subtracting the relative and base offsets. The relative offset is indicated by the Relative Offset Echo Instruction, whereas the base offset is a value stored in an appropriate base offset register. At a block 512, an ECHO_COUNTER is set to a length value indicated by the Relative Offset Echo Instruction.

At a block 516, an instruction indicated by the PC is executed. If the instruction is a CALL-type instruction, the following values should be saved and then restored on return: ECHO_MODE, RETURN_PC, ECHO_COUNTER, and BASE_OFFSET. At a block 520, the PC is updated to point to a next instruction. At a block 524, the ECHO_COUNTER is decremented. At a block 528, it is checked whether the ECHO_COUNTER is zero. If the ECHO_COUNTER is not zero, the flow returns to the block 516. If the ECHO_COUNTER is zero, the PC is set to the RETURN_PC at a block 532. At a block 526, the ECHO_MODE flag is cleared.

A processor architecture may support one or more Relative Offset Echo Instructions. For example, if a Relative Offset Echo Instruction includes a relative offset parameter and a length parameter, multiple Relative Offset Echo Instructions may be supported that correspond to different bit length relative offset parameters and length parameters. In one implementation, Relative Offset Echo Instructions having one-byte opcodes and two-byte opcodes such as the instructions listed in Tables 3 and 4 are supported.

TABLE 3

One-byte Opcodes

| Instruction | Bit-length of Relative Offset Parameter | Bit-length of Length Parameter |
| --- | --- | --- |
| Instruction #1 | 8 | 0 |
| Instruction #2 | 7 | 1 |
| Instruction #3 | 14 | 2 |
| Instruction #4 | 20 | 4 |

TABLE 4

Two-byte Opcodes

| Instruction | Bit-length of Relative Offset Parameter | Bit-length of Length Parameter |
| --- | --- | --- |
| Instruction #5 | 8 | 0 |
| Instruction #6 | 7 | 1 |
| Instruction #7 | 14 | 2 |
| Instruction #8 | 20 | 4 |

It is to be understood that the Relative Offset Echo Instructions listed in Tables 3 and 4 are merely illustrative examples of Relative Offset Echo Instructions that may be supported by a processor architecture. A particular architecture may support different Relative Offset Echo Instructions. For example, different length opcodes and different bit-length parameters may be supported. Similarly, different combinations of relative offset and length parameter bit-lengths may be supported. Additionally, some or all Relative Offset Echo Instructions may incorporate the relative offset parameter and/or the length parameter into the opcode. Further, if a processor includes multiple base offset registers, Relative Offset Echo Instructions may include a parameter to indicate an appropriate base offset register. Similarly, some or all Relative Offset Echo Instructions may incorporate an indication of the appropriate base offset register into the opcode.

Figure 12:
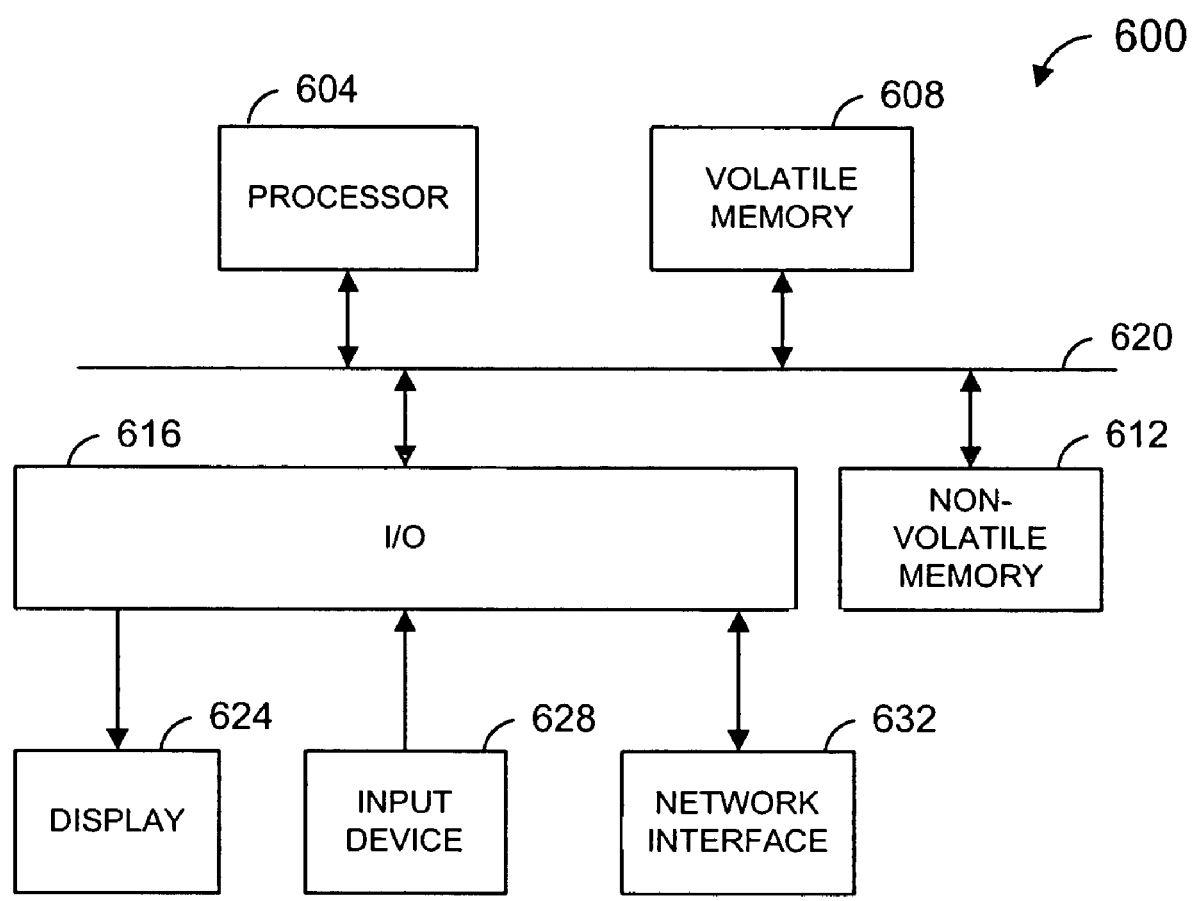
FIG. 12 is a block diagram of an example computing device that may be employed to compress code and/or execute code that includes an instruction at a first location to cause execution of a set of instructions at a second location.

FIG. 12 is a block diagram of an example computing device 600 that may be employed to compress code and/or execute code that includes Echo Instructions and/or Relative Offset Echo Instructions. It is to be understood that the computing device 600 illustrated in FIG. 12 is merely one example of a computing device that may be employed. As described above, many other types of computing devices may be used as well. The computing device 600 may include at least one processor 604, a volatile memory 608, and a non-volatile memory 612. The processor may or may not be configured to execute one or more of an Echo Instruction, a Relative Offset Echo Instruction, and a Set Echo Base Instruction. The volatile memory 608 may include, for example, a random access memory (RAM). The non-volatile memory 612 may include, for example, one or more of a hard disk, a read-only memory (ROM), a CD-ROM, an erasable programmable ROM (EPROM), an electrically erasable programmable ROM (EEPROM), a digital versatile disk (DVD), a flash memory, etc. The computing device 600 may also include an I/O device 616. The processor 604, volatile memory 608, non-volatile memory 612, and the I/O device 616 may be interconnected via one or more address/data buses 620. In some embodiments, one or more of the volatile memory 608, non-volatile memory 612, and the I/O device 616 may be coupled to the processor 604 via one or more separate address/data buses (not shown) and/or separate interface devices (not shown), coupled directly to the processor 604, etc.

The computing device 600 may also include at least one display 624 and at least one user input device 628. The user input device 628 may include, for example, one or more of a keyboard, a keypad, a mouse, a touch screen, etc. Additionally, the computing device 600 may also include a network interface device 632 to couple the computing device 600 to a network such as a local area network, a wide area network, a wireless network, the Internet, etc.

The display 624, the user input device 628, and the network interface device 632 are coupled with the I/O device 616. Although the I/O device 616 is illustrated in FIG. 12 as one device, it may comprise several devices. Additionally, in some embodiments, one or more of the display 624, the user input device 628, and the network interface 632 may be coupled directly to the address/data bus 620 or the processor 604.

Referring again to FIGS. 1 and 7, some or all of the example system 100 and/or some or all of the example system 300 may be implemented using a device such as the device 600 of FIG. 12. For example, the code compressor 124, the code reorderer 128, and/or the code compressor 304 could be implemented by the device 600. Similarly, the compiler 112 and/or the linker 120 could be implemented by the device 600. As just one example, a computer program for implanting the code compressor 124, at least in part, could be stored in the non-volatile memory 612 and executed by the processor 604.

Referring again to FIGS. 2, 3, and 8 some or all of each of the example methods 160, 200, and 350 may be implemented using a device such as the device 600 of FIG. 12. For example, a computer program for implementing one or more of the blocks 164, 168, 172, and 176 of FIG. 2 could be stored in the non-volatile memory 612 and executed by the processor 604.

Referring again to FIGS. 4-6 and 9 some or all of each of the example routines 220, 240, 260, and 400 may be implemented using a device such as the device 600 of FIG. 12. For example, a computer program for implementing some or all of the routine 220 of FIG. 4 could be stored in the non-volatile memory 612 and executed by the processor 604.

Referring again to FIG. 10, the processor 604 of FIG. 6 may or may not include a subsystem such as the subsystem 450. Referring again to FIG. 11, the processor 604 may or may not be configured to implement a method such as the method 500. If the processor 604 is configured to implement the method 500, it may be implemented using any combination of hardware, software, firmware, etc.

A processor that includes a subsystem such as the subsystem 450 of FIG. 10, and/or that is configured to implement a method such as the method 500 of FIG. 11 may be used in a variety of systems, including system such as the system 600 of FIG. 12. For example, such a processor could be used in a desktop computer, a laptop computer, a workstation, a server, a mainframe, a personal digital assistant (PDA), a television set-top box, a portable communication device (e.g., a cellular phone, a satellite phone, a pager, etc.), embedded systems, etc.

Some or all of the blocks of FIGS. 1-3, 7, and 8, and the routines of FIGS. 4-6 and 9 may be implemented using one or more software programs. Each such program may be for execution by a processor and may be stored on a computer readable medium such as one or more of a CD-ROM, a floppy disk, a hard drive, a digital versatile disk (DVD), a memory card, a memory stick, a read-only memory (ROM), a random-access memory (RAM), an erasable programmable ROM (EPROM), an electrically erasable programmable ROM (EEPROM), a carrier wave signal, etc., or a memory associated with the processor, but persons of ordinary skill in the art will readily appreciate that the entire program or parts thereof could alternatively be executed by a device other than a processor, and/or embodied in firmware and/or dedicated hardware in a well known manner. Further, although example methods and programs are described with reference to particular flow diagrams and pseudocode, persons of ordinary skill in the art will readily appreciate that many other methods and routines may alternatively be used. For example, the order of execution of the blocks or pseudocode statements may be changed, and/or the blocks or pseudocode statements may be changed, eliminated, or combined.

Similarly, some or all of the blocks of FIGS. 1, 7, 10-12 may be changed, eliminated, or combined.

It is to be understood that the techniques described herein may be combined. For example, some or all of the techniques described with reference to FIGS. 1-6 may be combined with some or all of the techniques described with reference to FIGS. 7-11.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for reducing code size, the method comprising the acts of:

identifying a replaceable subset of instructions at a first location within a set of instructions and a matching target subset of instructions at a second location within the set of instructions;

determining an absolute offset from a first location to the second location:

determining a base offset based on the absolute offset;

determining a relative offset based on the absolute offset and the base offset, wherein a sum of the base offset and the relative offset equals the absolute offset from the first location to the second location;

inserting, prior to the first location, a first instruction to cause a base offset storage element to be loaded with the base offset;

replacing the replaceable subset of instructions with a second instruction to cause a program counter to be modified by the sum of the relative offset and the base offset loaded in the base offset register by the first instruction, wherein the modified program counter indicates the second location;

wherein matching a target subset of instructions at the second location includes choosing the target subset of instructions from a plurality of candidate target subsets of instructions at different locations;

wherein choosing the target subset of instructions comprises at least one of A, B, and C:
   A) determining sizes of candidate second instructions to replace the replaceable subset of instructions, each candidate second instruction to cause the program counter to be modified to indicate the location of the corresponding candidate target subset of instructions; and
      choosing the target subset of instructions from the plurality of candidate target subsets based on the sizes of the candidate second instructions;
   B) determining respective absolute offsets between the first location and the locations of the plurality of candidate target subsets; and
      choosing the target subset of instructions from the plurality of candidate target subsets based on the determined absolute offsets;
   C) choosing the target subset of instructions from the plurality of candidate target subsets based on whether candidate target subsets are located in regions of frequently executed code.

2. A method according to claim 1, wherein determining the base offset and the relative offset comprises:
   determining the absolute offset from the first location to the second location;
   determining the base offset based on the absolute offset; and
   determining the relative offset based on the absolute offset and the base offset.

3. A method according to claim 2, wherein determining the relative offset comprises subtracting the base offset from the absolute offset.

4. A method according to claim 2, wherein replacing the replaceable subset of instructions with the second instruction comprises:
   replacing the replaceable subset of instructions with a third instruction to cause the program counter to be modified based on the absolute offset, wherein the modified program counter indicates the second location; and
   replacing the third instruction with the second instruction.

5. A method according to claim 1, further comprising the act of reordering at least some portions of the set of instructions to reduce the absolute offset.

6. A computer readable medium having stored thereon machine executable instructions to cause the machine to:
   identify a replaceable subset of instructions at a first location within a set of instructions and a matching target subset of instructions at a second location within the set of instructions;
   determine an absolute offset from a first location to the second location;
   determine a base offset based on the absolute offset;
   determine a relative offset based on the absolute offset and the base offset, wherein a sum of the base offset and the relative offset equals the absolute offset from the first location to the second location;
   insert, prior to the first location, a first instruction to cause a base offset storage element to be loaded with the base offset;
   replace the replaceable subset of instructions with a second instruction to cause a program counter to be modified by the sum of the relative offset and the base offset loaded in the base offset register by the first instruction, wherein the modified program counter indicates the second location;

wherein matching a target subset of instructions at the second location includes choosing the target subset of instructions from a plurality of candidate target subsets of instructions at different locations;

wherein to choose the target subset of instructions comprises machine executable instructions to cause the machine to at least one of A, B, and C:
   A) determine sizes of candidate second instructions to replace the replaceable subset of instructions, each candidate second instruction to cause the program counter to be modified to indicate the location of the corresponding candidate target subset of instructions; and
      choose the target subset of instructions from the plurality of candidate target subsets based on the sizes of the candidate second instructions;
   B) determine respective absolute offsets between the first location and the locations of the plurality of candidate target subsets; and
      choose the target subset of instructions from the plurality of candidate target subsets based on the determined absolute offsets;
   C) choose the target subset of instructions from the plurality of candidate target subsets based on whether candidate target subsets are located in regions of frequently executed code.

7. A computer readable medium according to claim 6, the machine executable instructions to cause the machine to:
   determine the absolute offset from the first location to the second location;
   determine the base offset based on the absolute offset; and
   determine the relative offset based on the absolute offset and the base offset.

8. A computer readable medium according to claim 6, the machine executable instructions to cause the machine to reorder at least some portions of the set of instructions to attempt to reduce the absolute offset.

* * * * *